Sept. 1, 1936.  F. W. GAINES  2,052,761

ELECTRICAL BLANK HEATING MACHINE.

Filed Dec. 21, 1933  6 Sheets-Sheet 1

INVENTOR
Frederick W. Gaines,
BY
Justin W. Macklin
ATTORNEY

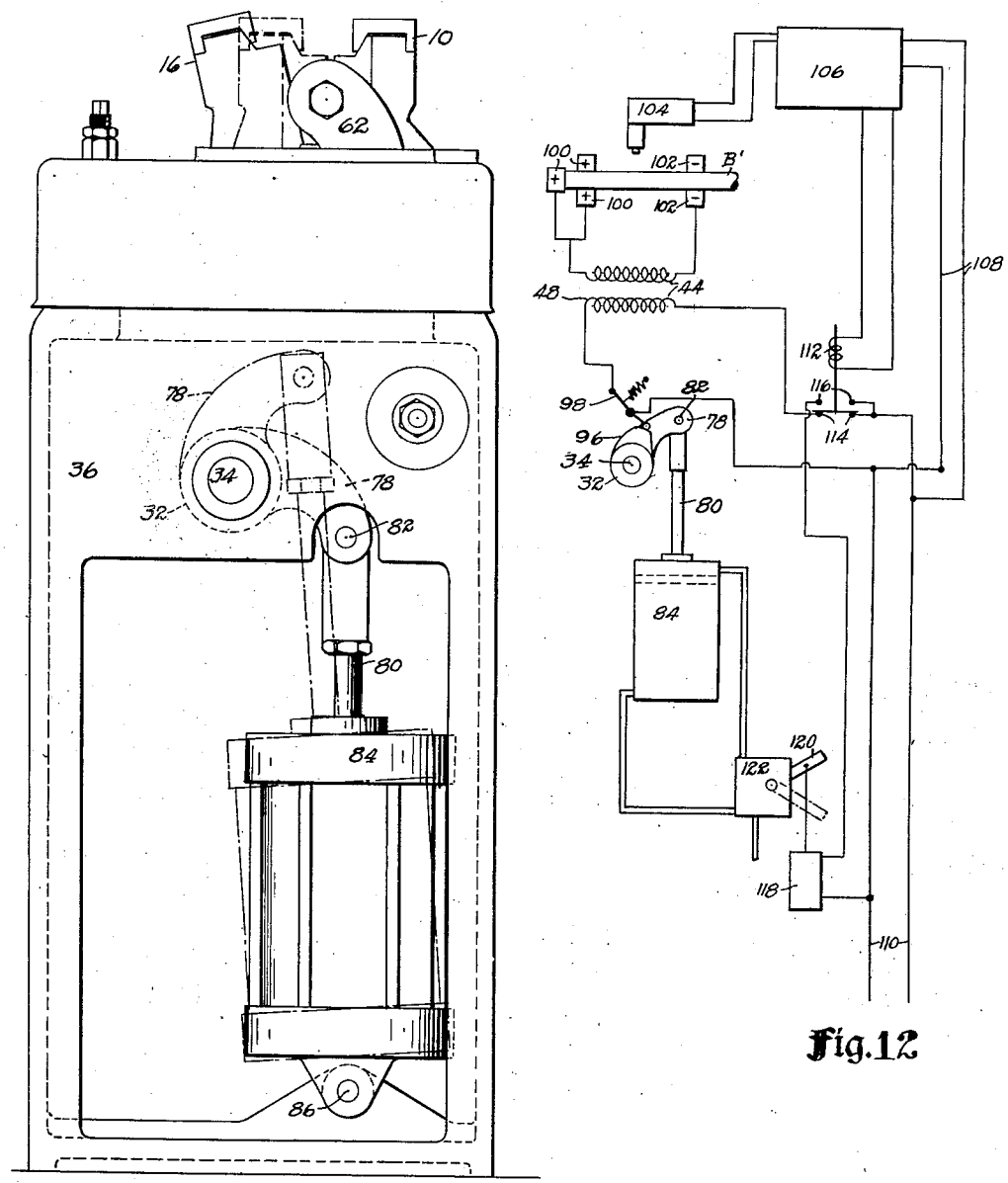

Sept. 1, 1936.  F. W. GAINES  2,052,761
ELECTRICAL BLANK HEATING MACHINE
Filed Dec. 21, 1933  6 Sheets-Sheet 4

INVENTOR
Frederick W. Gaines
BY Justin W. Macklin
ATTORNEY

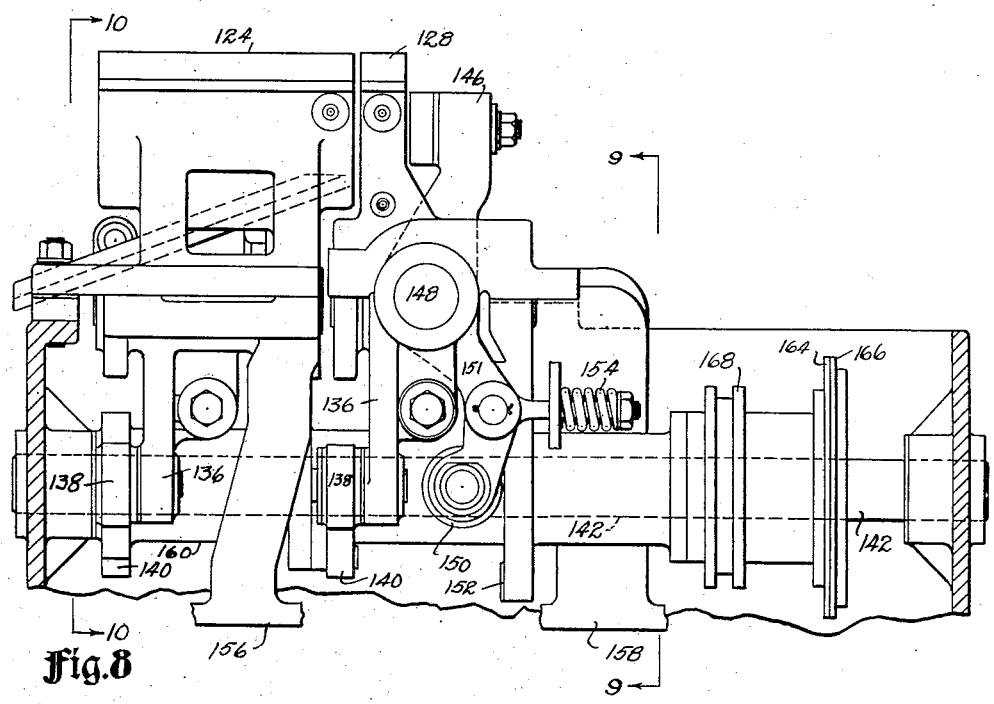
Fig.8
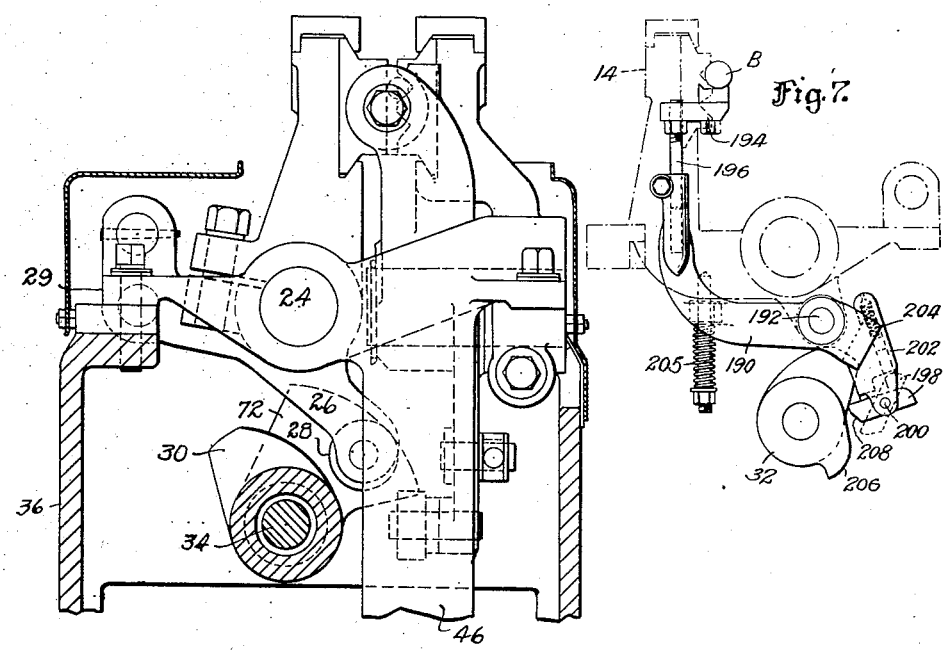
Fig.7
Fig.6
Frederick W. Gaines INVENTOR
BY Justin W. Macklin ATTORNEY Sept. 1, 1936. F. W. GAINES 2,052,761
ELECTRICAL BLANK HEATING MACHINE
Filed Dec. 21, 1933 6 Sheets-Sheet 6

INVENTOR
Frederick W. Gaines
BY Justin W. Macklin
ATTORNEY

Patented Sept. 1, 1936

2,052,761

UNITED STATES PATENT OFFICE 2,052,761

ELECTRICAL BLANK HEATING MACHINE

Frederick W. Gaines, Euclid, Ohio, assignor to The Ajax Manufacturing Co., Euclid, Ohio, a corporation of Ohio Application December 21, 1933, Serial No. 703,432

11 Claims. (Cl. 219—11)

This invention relates to electrical blank heating machines for heating objects or blanks for subsequent forging, upsetting operations, or heat treating of the blanks. The invention has particular reference to machines of this character adapted to heat blanks or similar objects intermediate their ends or from one end inward, or various combinations thereof.

It is an object of this invention to provide a blank heating machine for contacting blanks or objects to be heated at a plurality of points therealong, and passing current through the blank from these points until a predetermined or desired temperature has been reached.

It is another object to provide a machine having electrode jaws for gripping and delivering current to blanks with means for connecting the jaws to a source of current supply after the jaws have contacted and gripped the blanks, and to disconnect the blanks from the source before being released by the jaws.

It is still another object to provide in connection with a machine of this character a thermal responsive device adapted to disconnect a heating blank from a source of supply after a predetermined heat condition has been reached, and to further cause contacting and gripping electrode jaws to subsequently release the blank after it has been disconnected from the source of supply.

Other and more specific objects include the novel arrangement and combination of elements to effect simple and expeditious handling of blanks or objects to be heated, as will more fully hereinafter appear in the description taken in connection with the drawings, in which—

Fig. 3 is an end elevation as viewed from the right in Fig. 2.

Fig. 6 is a similar end elevation as viewed in Fig. 3.

Fig. 7 is a detailed and partially diagrammatic view of a moving stock rest used in conjunction with this embodiment.

Fig. 8 is a fragmentary sectional view of another form which my invention may take.

Fig. 12 is a diagrammatic view showing the adaptation of a thermal responsive device to control the heating of blanks by such embodiments as referred to.

Figure 1:
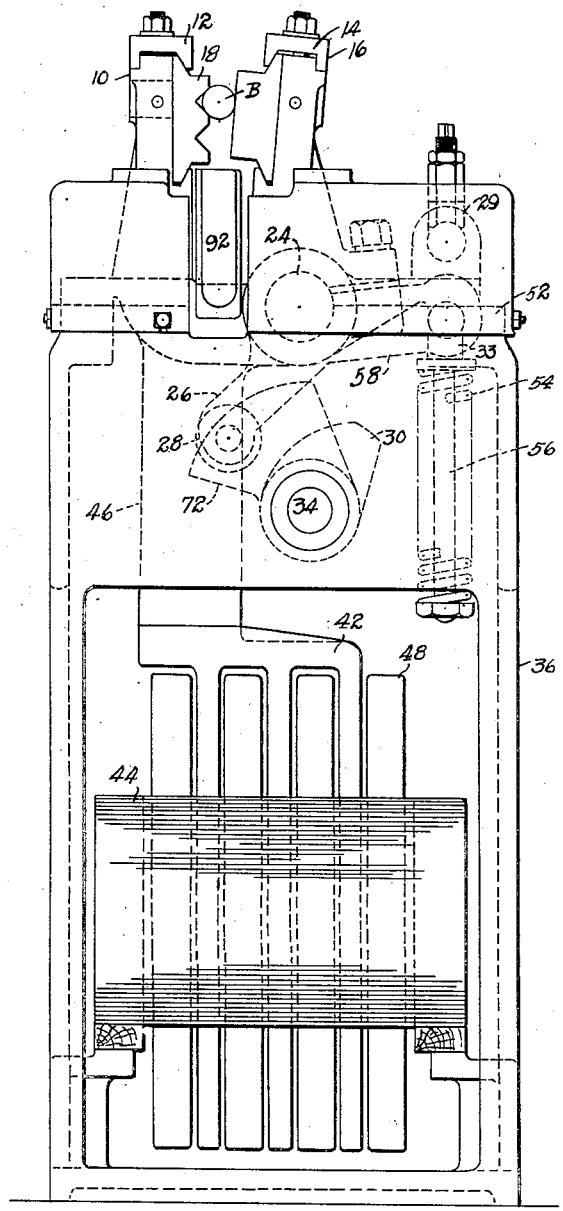
Fig. 1 is an end elevation of an embodiment of my invention.

Figs. 13 to 16 inclusive show top views in diagrammatic form of the contacting of blanks by the electrode jaws in these embodiments.

Referring now to Figs. 1 to 6, there are shown stationary side contacting and gripping electrode jaws 10 and 12. The stationary jaw 10 is supported on and rigid with a frame 22, while the stationary jaw 12 is supported on and rigid with another frame 23 electrically insulated from the frame 22 by the air gap 14. The jaws 10 and 12 are chromium plated to prevent oxidation of the copper from the radiated heat from the bar and from the heat caused by its own resistance. Coacting with the stationary jaw 12 is a movable electrode jaw 14 pivotally mounted on and electrically contacting with a shaft 24 supported from the frame 23. Coacting with the stationary jaw 10 is a movable electrode jaw 16 pivotally mounted and electrically contacting a shaft 25 supported from the frame 22. The frame 22 is connected to the secondary winding 42 of a supply transformer 44 by the lead 46. The frame 23 is connected to the same secondary winding 42 by a lead 50. Thus it will be obvious that electrode jaws 10 and 16 receive current of the same polarity, while electrode jaws 12 and 16 receive current of an opposite relative polarity. The shafts 24, 25 and 66 may be chromium plated to produce a good unlubricated bearing surface which affords good electrical conductivity with the copper casting.

The frames 22 and 23 are insulated from a supporting frame 36 both electrically and magnetically by a suitable spacing member 52, which may be of wood, micarta, or the like. This spacing may be a combination of a non-magnetic metallic member overlying a suitable electrical insulating member instead of being a single member, as just described.

The movable electrode jaws 14 and 16 each have downwardly extending arms 26 bifurcated at their ends to receive and rotatably support rollers 28 adapted to be engaged by segmental cams 30 rigid with a cam supporting member 32 rotatably mounted on a supporting shaft 34 extending transversely of the machine and bearinged in the frame 36 as at 38 and 40.

The movable electrode jaws 14 and 16 are normally urged toward their corresponding stationary jaws by action of similar springs 54 concentric with rods 56 pivotally supported from the frames 22 and 23 through the members 27 and 29, the springs reacting against counter arms 58 of the movable jaws through lugs 31 and 33 pivotally secured therein.

Figures 4, 11:
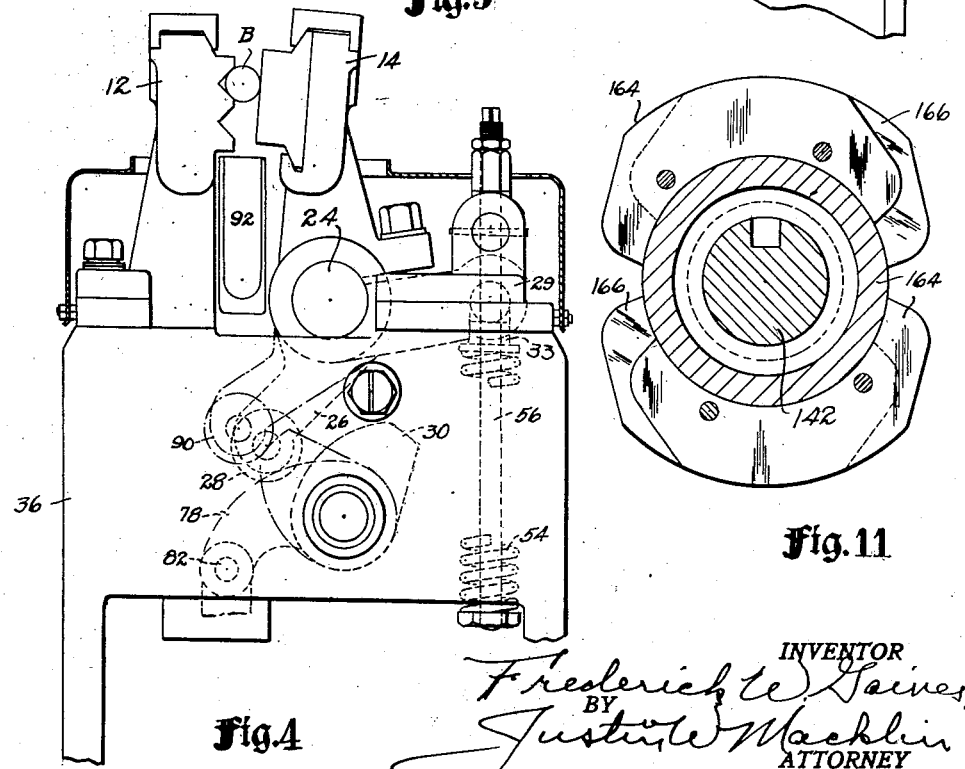
Fig. 4 is an enlarged end elevation partly in section of the embodiment as viewed in Fig. 1.
Fig. 11 is a detailed view of switch controlling cams for use with the embodiment illustrated in Figs. 8, 9 and 10.

When the movable electrode jaws are in their closed positions, that is when gripping a blank B as shown in Fig. 1, the rollers 28 are out of contact with the actuating cams 30, so that no electric connection exists therebetween, as may be seen in Fig. 4.

Figure 2:
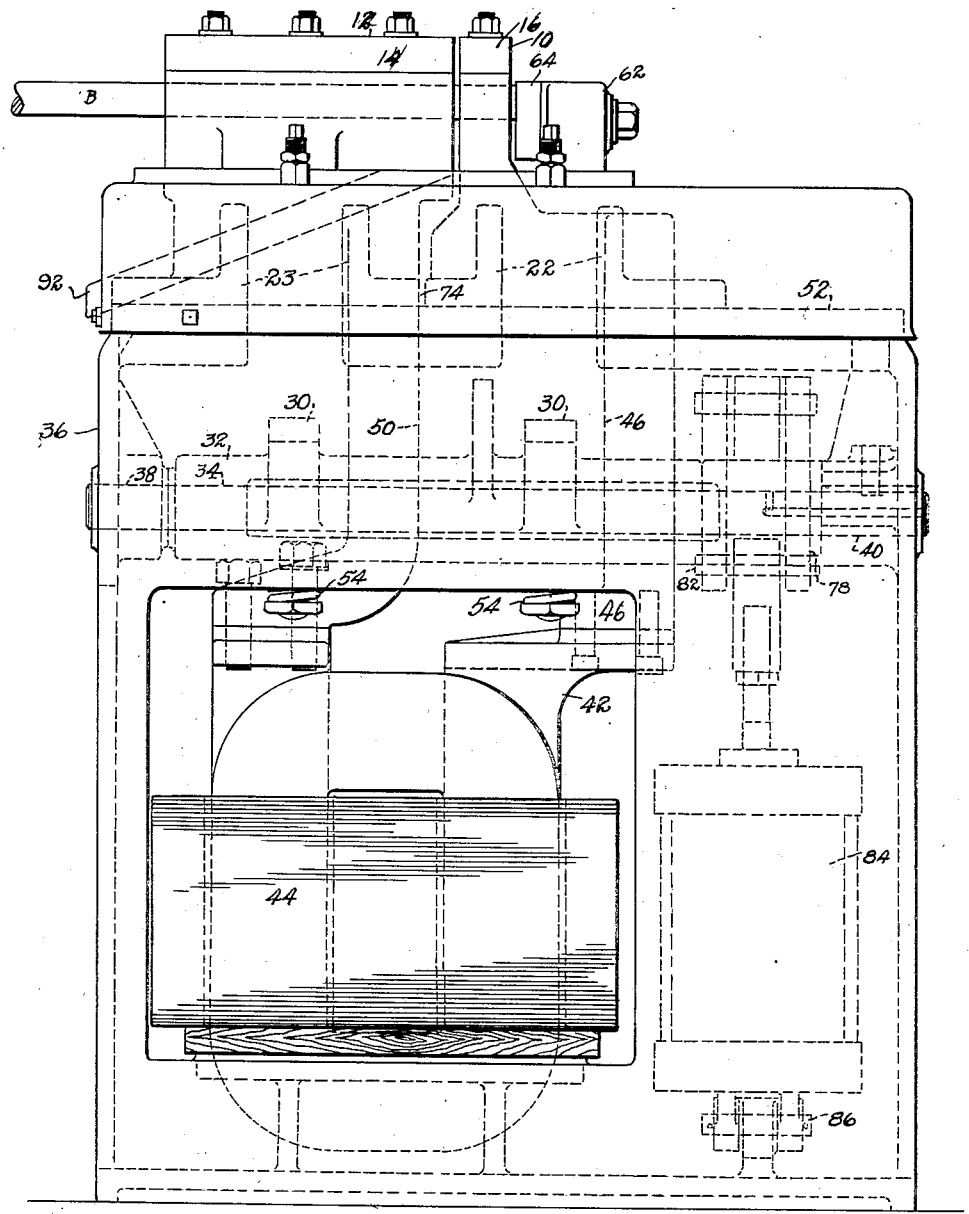
Fig. 2 is a side elevation as viewed from the right in Fig. 1.

An end contactor is shown at 62 as having a contacting face member 64 and as pivotally mounted on a shaft or like support at 66 supported in the frame 22. This end contactor has a downwardly extending arm 68 with a roller 70 rotatable therein and adapted to contact a segmental cam plate 72, also integral with the member 32. The cam 72 is out of contact with the roller 70 when the face member 64 has moved to the left (Fig. 2). This end contactor 62 is in electrical contact with the frame 22, so as to receive current of the same polarity as the side contacting electrode jaws 10 and 16.

The cam supporting member 32 may have extending therefrom an actuating lever 78 pivotally joined with a connecting rod 80 as at 82, the connecting rod 80 being associated with a piston in an air cylinder 84. The air cylinder is preferably pivotally mounted on the supporting frame 36 as indicated at 86, so that it may rock as the piston therein is reciprocated (see dot and dash lines).

The air cylinder 84 is preferably of the double acting type and admission of air thereto may be controlled either manually or automatically by any of the well known means. An essential feature of this arrangement is the oscillatory actuation of the cam supporting member 32 so as to bring the cams 30 into engagement with the rollers 28, to move the movable electrode jaws 14 and 16 away from the stationary jaws 10 and 12 to release a blank therebetween, after the cam 72 has engaged the roller 70 to cause the end contactor 62 to move away from and out of contact with the blank, against the tension of a suitable spring normally urging it toward the blank and which, for the sake of clearness, has been omitted, but which may connect with the lever 68 at the point 88 and be adapted to urge the lower end of the lever to the right, as viewed in Fig. 5.

In the operation of the embodiment described, to open the electrode jaws to admit a suitable blank "B" therebetween, air is admitted to the air cylinder 84 so as to force the connecting rod 80 downwardly (as viewed in Fig. 3) and thereby oscillate the cam supporting member 32, causing the cams 30, which are normally out of engagement with the rollers 28, to move toward and engage the rollers so as to arcuately move the electrode jaws 14 and 16 away from the corresponding stationary jaws 10 and 12.

In this position the cams 30 and the rollers 28 are as indicated by the dot and dash lines 90 in Fig. 4, after the segmental cam plate 72, which is normally out of contact with the roller 70, moves toward and contacts this roller which causes the end contactor 62 to arcuately move to the right, as viewed in Fig. 2, i. e., away from the blank "B". The blank "B" may then fall down between the contacting jaws upon the chute 92, and thereupon be discharged from the machine by sliding down the chute.

A new blank may then be positioned between the gripping and contacting jaws and air admitted to the cylinder 84 so as to oscillate the cam carrying member 32 in a reverse direction, and thereupon permit the side contacting jaws to contact with and grip the blank and the end contactor to move toward and contact the end of the blank. The end contactor may also act as a stock gage for the work pieces.

In order that the electrode jaws may contact the blank without undue arcing, I may provide an additional cam 96 (see Fig. 12) on the member 32, which is preferably positioned, with respect to the cams 30 and 72, so as to close a circuit to the primary 48 of the transformer 44, by actuating a suitable switch 98 with a sufficient delay to permit the blank to be contacted by the electrode jaws and end contactor before the switch is closed. I prefer also to arrange the cam to interrupt the current before the electrode jaws and end contactor move away from the blank. Thus this switch cam 96 is active when the jaw actuating cams are inactive.

The operation of the apparatus described may be partially automatic by providing means for automatically interrupting the current to the blank and releasing the blank upon the reaching of a predetermined heat condition. I have indicated in Fig. 12 in somewhat diagrammatic form an arrangement of apparatus for so controlling a machine. A blank B' is shown as being contacted by electrode contactors 100 and 102 of opposite relative polarity. Positioned above the heating portion of the blank B' is shown a thermally responsive device 104 such, for example, as a photo-tube device, electrically connected to an amplifier 106 which is, in turn, connected to a source of current supply through the lines 108 and 110. The thermally responsive device 104 will generate a current therein due to reception of radiant energy from the heating blank B', and this current will be amplified by the amplifier 106 to energize relay 112 to open normally-closed contacts 114, thereby interrupting the circuit to the primary winding 48 of the transformer. Opening of the relay 112 closes contacts 116, thereby energizing the solenoid 118, which is connected to a handle 120, which handle is used for manually operating a valve 122 for controlling admission of air or similar fluid to the cylinder 84. The handle 120 is adapted to be normally pushed upwardly to the position shown in solid lines to cause the cam carrying member 32 to rotate in a direction to cause the electrode jaws to grip a blank, and to close the switch 98 to the primary of the transformer. When the solenoid 118 is energized, the handle 120 is pulled downwardly thereby causing fluid to be admitted to the cylinder 84 to actuate the cam carrying member 32 in a reverse direction, first causing the switch 98 to be opened and subsequently the electrode jaws and end contactor to be moved away from the blank and release it. It will thus be seen that this apparatus provides for a definite automatic control for controlling the heating of blanks.

Figure 5:
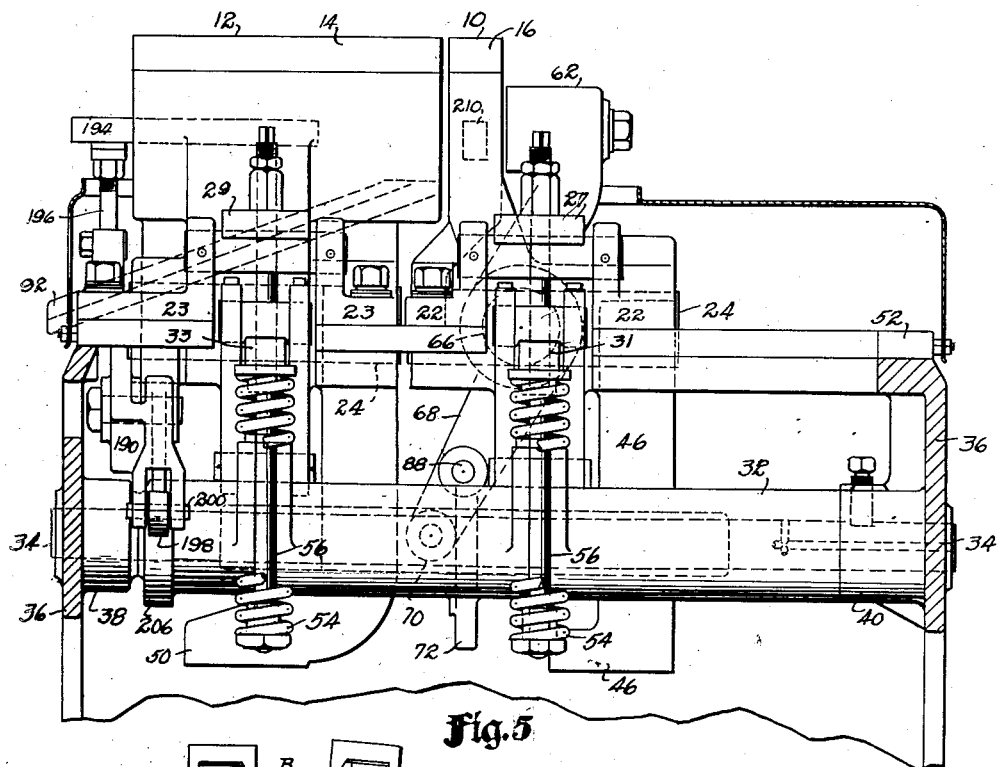
Fig. 5 is a similar side elevation, as viewed in Fig. 2.

To facilitate the handling of long blanks while being gripped by the electrode jaws, I may provide a moving stock rest such as is shown in Figs. 5 and 7. This stock rest may comprise a movable arm 190 pivoted as at 192 and curving upwardly to support a stock rest finger 194 through an adjustable pin 196. The lower end of the lever 190 may have a latch 198 pivoted in a bifurcated end as at 200 and normally urged to the position shown in solid lines by a plunger 202 and a spring 204. A cam 206 may be disposed on and rigid with the cam supporting member 32 and be adapted to engage the end 208 of the latch 198 when this cam supporting member is rotated in a direction to cause the electrode jaws to open. When the cam engages the end of the latch it will cause the stock rest 194 to swing away from the stationary electrode jaws and permit the stock supported thereby to fall down in the chute.

The arm 190 is normally urged upwardly by a spring 205, that is, in position to support the blank. When the cam rotates in the reverse direction the latch 198 yields, as indicated in dotted lines, to prevent movement of the stock rest.

One of the stationary electrode jaws may have projecting therefrom a stock supporting shelf or ledge 210 which may serve to support the end of the blank adjacent the end contactor. The length of the stock rest finger 194 may however be made sufficient to support the blank in which case this shelf is unnecessary.

Figure 10:
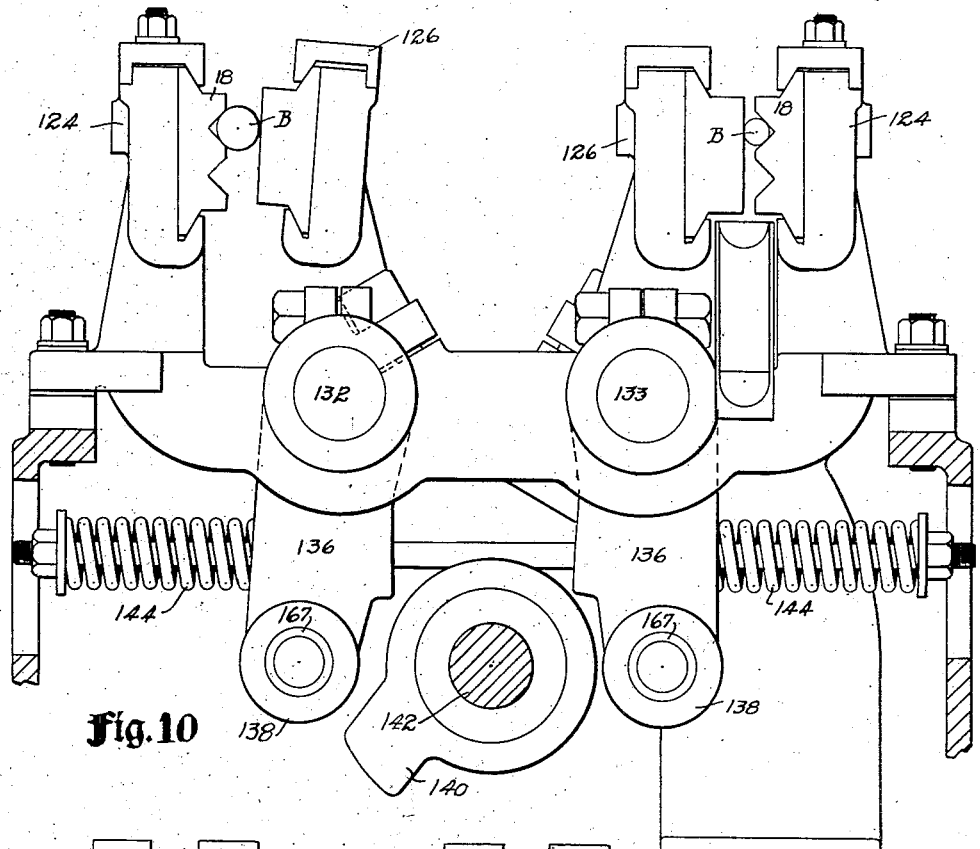
Fig. 10 is a cross sectional view taken substantially along the lines 10—10 of Fig. 8.
Figure 9:
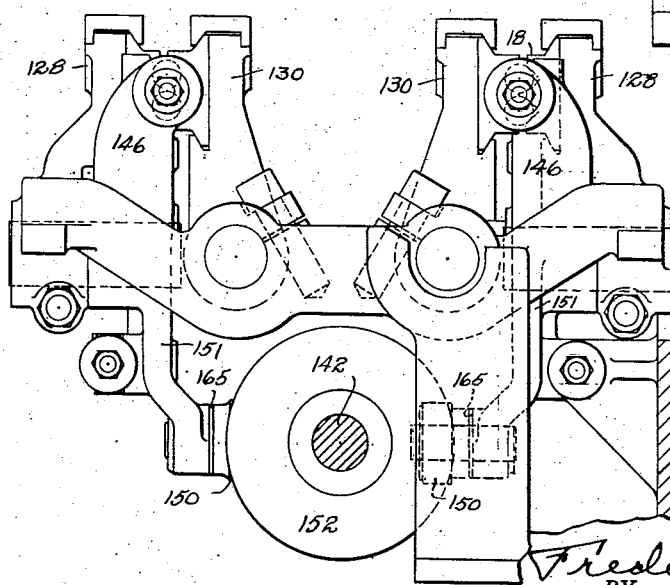
Fig. 9 is a fragmentary end view of the embodiment shown in Fig. 8 along the line 9—9.

Another embodiment of my invention in which two blanks may be heated alternately by a parallel arrangement of similar electrode jaws is shown in Figs. 8, 9 and 10. Stationary electrode jaw 124 coacts with a similar movable jaw 126 of like polarity while another stationary jaw 128 coacts with a second movable jaw 130 of like polarity, the latter two jaws being of opposite polarity to the first two. The movable jaws may be pivoted on shafts 132 and 133 and have downwardly extending arms 136 with which are associated rollers 138 normally urged toward cams 140 rigid with a driving shaft 142 by springs 144, as is indicated in Fig. 10. End contactors 146 coact with each group of side contacting jaws in a manner similar to that already described, each being pivoted on a shaft 148 and each having a roller 150 normally urged into contact with a cam 152 by springs 154. The essential difference between this embodiment and that previously described is that the shaft 142 may be continuously rotated, causing periodic engagement between the high part of the cam 140 and the rollers 138 to cause alternate movement of the movable jaws, so that while a blank in one set of jaws is being heated, the blank in the other set of jaws is being discharged and a fresh blank is being supplied thereto.

These jaws and end contactors may be connected through their respective supporting frames to a supply transformer by leads 156 and 158 in the manner heretofore described.

The cams 140 may be disposed on the cam supporting member 160 so as to cause the two movable jaws of opposite polarity to contact the blank simultaneously or to cause one of the movable jaws to contact later than the other. The side contacting jaws may contact the blank and deliver current therethrough intermediate its ends, and the cams 152 may be disposed with respect to the cams 140 so as to cause the end contactor 146 to subsequently contact the end of the blank to pass current from the end therethrough.

I may also provide on the driving shaft 142 a switching mechanism comprised of relatively movable cam members 164 and 166, each of which has two high portions and one of which is rotatable with respect to the other by axial movement of a collar 168 associated therewith. This mechanism is preferably of the construction illustrated and described in the application for an electric heating apparatus filed by John R. Blakeslee, Serial No. 610,379, and illustrated in Figs. 7, 12, 13, 14, and 15 thereof, with the exception that each cam is provided with two high portions instead of one. These cams may be used to actuate a switch in the primary circuit of a suitable transformer, or two primaries of two transformers, as has been described in connection with Fig. 12. Such an arrangement is intended to serve as a means of alternately connecting and disconnecting blanks held by the electrode jaws, i. e., to connect the blank to a current source after the blank has been gripped and to disconnect it before the blank has been released.

To provide electrical insulation between the operating cams and the movable jaws and end contactor, I may use insulating washers 165 and insulating sleeves 167 to insulate the rollers 138 and 150 from their carrying arms 136 and 151.

Figure 13:
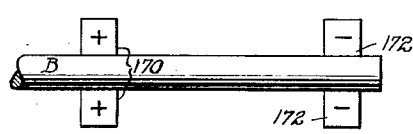
Figure 14:
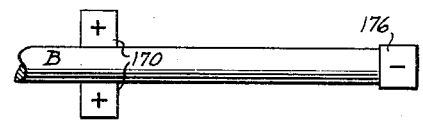
Figure 15:
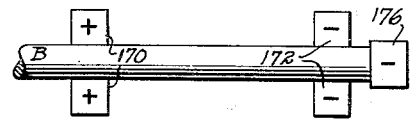
Figure 16:
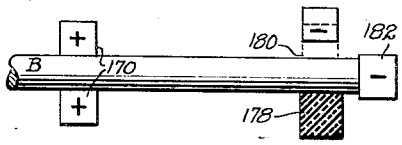

In the embodiments illustrated in Figs. 1 to 6, inclusive, it is to be understood that the side contacting jaws may be actuated so that a blank B is contacted at side points intermediate its ends as shown at 170 and 172 in Fig. 13, or at side points as shown at 170 and at its end 176, as shown in Fig. 14. Or, the jaws may be arranged to contact at all three points, as shown in Fig. 15. In the embodiment illustrated in Figs. 8 to 10, inclusive, it is to be understood that the mechanism may be actuated to cause contacting with a blank in either of the ways shown in Figs. 13, 14 or 15, and also as shown in Fig. 16, wherein the stationary contactor 178 adjacent the end contactor may have a contacting face of insulating material, and contact may be first made at the points 179 and at 180, as shown by the dotted lines, and subsequently, contact may be made at the end, as shown at 182, the side contact 180 then moving away, as shown in solid lines, so that contacts 170 and 182 remain. This provides for heating the blank intermediate its ends before the end contactor comes into action, thereby minimizing the wear on the end contactor, as well as providing for a more flexible control of the heating of the blank. The contactors may also be provided with openings and inlet and outlet pipes (not shown), to cause circulation of a cooling medium therethrough.

It will be noted that in all of the embodiments, I have shown one of the contacting blocks 18 as being notched to provide for the admission of current to the blank at parallel points. Such an arrangement also provides for a more effective gripping of the blank, in that the pressure at the contacting points in the notches is greater than would result with vertical faces or circular notched faces. It is well known that point contacts made with great pressure are more effective than large area contacts at low pressure. It will be understood, of course, that I may provide notches in the contact blocks of both the movable and stationary jaws where desirable, such as is shown in Fig. 9. Also, both upper and lower notches may be provided so that either may be used, thereby obviating the necessity of frequent contact changes.

Also, it will be noted that the contact blocks are held in place through a dove-tail construction. Where the width of the block in the axial direction of the blank is such that the portion of the blank being heated is exposed to contact with the air, I may make laminations of heat resisting and insulating material of the same configuration as the contact blocks and so space them in the jaws axially of the blank as to substantially enclose that portion of the blank being heated so as to exclude circulation of the air therearound and materially prevent oxidation of the blank. This process of enclosing a heating blank, sometimes called "muffling", is well known in the art to be effective in reducing the scale formed on heated blanks.

I claim:

1. In an electrical blank heater, the combination of stationary and movable side contacting electrode jaws, an end contactor, means actuating said movable jaws through an arcuate path toward said stationary jaws to grip and contact a blank therebetween, and means for subsequently actuating said end contactor to contact said blank to complete a circuit therethrough.

2. In an electrical heater, the combination of a plurality of side contacting and gripping jaws, certain of said jaws being of one relative polarity and others being of an opposite relative polarity, an end contactor having a polarity corresponding to that of one of said groups of side contactor jaws, means whereby said side contactor jaws contact with and grip a blank, and means whereby said end contactor subsequently contacts with the end of said blank.

3. In an electrical heater, the combination of a stationary side contacting and gripping electrode jaw, a coacting pivotally mounted movable side gripping and contacting jaw, means oscillating said movable jaw toward and away from said stationary jaw, an end contactor, and means actuating said end contactor in a plane normal to the movement of said movable side jaw.

4. In a heating apparatus, the combination of a stationary electrode jaw, a movable electrode jaw, an end contactor, an oscillatable member, and means responsive to a movement of said oscillatable member for simultaneously actuating said movable jaw and end contactor to effect movement of the movable jaw and end contactor relative to the stationary electrode jaw to vary the pressure engagement of the jaws and contactor with a work blank.

5. In a heating apparatus, the combination of a stationary electrode jaw, a movable electrode jaw, an end contactor, a rotatable member, and means responsive to rotation of said member for periodically actuating said movable jaw and end contactor to effect movement of the movable jaw and end contactor relative to the stationary electrode jaw to vary the pressure engagement of the jaws and contactor with a work blank.

6. In a device of the class described, a pair of stationary blank gripping jaws, a pair of movable jaws, means actuating each of the movable jaws towards a stationary jaw to clamp a work blank between the stationary jaw and the movable jaw, means actuating the movable jaws away from the stationary jaws to release a blank clamped therebetween, said last named means being operable to move each of the movable jaws independently of the other whereby one of the movable jaws is actuated away from the stationary jaw associated therewith while the other movable jaw is maintained in a position to clamp a work blank between said movable jaw and the stationary jaw, and end contactors adapted to have pressure engagement with work blanks held by said movable and stationary jaws.

7. In a device of the class described, a plurality of blank gripping electrodes adapted to have pressure engagement with blanks to be heated, means to effect relative movement between the blanks and the electrodes to vary the pressure between the blanks and electrodes, a circuit for supplying current to said electrodes, means for controlling said circuit and operable to complete the circuit to the electrodes subsequent to the engagement of the electrodes with the work blanks and to interrupt the circuit prior to the disengagement of the electrodes and the work blanks, the means for effecting pressure engagement of the electrodes and work blanks and the circuit control means being responsive to movement of a common actuating member, a device responsive to radiant energy of a work blank being heated, and means associated with said device for utilizing the effect of radiant energy on said device to effect movement of the common actuating member to interrupt the circuit to the electrodes and to effect disengagement of the electrodes and the work blank.

8. In a device of the class described, a plurality of blank gripping electrodes, means for effecting gripping and opening movement of the electrodes, a circuit for supplying current to the electrodes, a switch, means for operating the switch actuated by the electrode operating means to complete the circuit of the electrodes subsequent to their engagement with the work blanks and to interrupt the circuit prior to disengagement, a variable pressure means for actuating the electrode operating means, and a radiant energy responsive mechanism for controlling the variation in said pressure means.

9. In a device of the character described, a plurality of blank gripping electrodes, means for effecting gripping and opening movement of electrodes, a circuit for supplying current to the electrodes, a switch in said circuit, means for operating said switch actuated by the electrode operating means to complete the circuit of the electrodes subsequent to their engagement with the work blanks and to interrupt the circuit prior to disengagement, and a pressure means responsive to the temperature of the blank for actuating the electrode operating means.

10. In an electrical heating machine, the combination of a pair of relatively movable gripping jaws, a pair of stationary blank gripping jaws, means actuating each of the movable jaws towards a stationary jaw to clamp a work blank between the stationary jaw and the movable jaw, means actuating the movable jaws away from the stationary jaws to release a blank clamped therebetween, a movable blank rest, and means associated with the last mentioned actuating means for movement of said blank rest toward and away from its supporting position in timed relation with said movable jaws.

11. In a device of the class described, a pair of blank gripping jaws, a pair of movable jaws, an oscillating member, means actuating each of the movable jaws towards a stationary jaw associated therewith to clamp a work blank between the stationary jaw and the movable jaw, and means responsive to the oscillating member actuating the movable jaws away from the stationary jaws to release a blank clamped therebetween, said last named means operable to move each of the movable jaws independently of the other whereby one of the movable jaws is actuated away from the stationary jaw while the other movable jaw is maintained in a position to clamp a work blank between said movable jaw and the stationary jaw.

FREDERICK W. GAINES.